United States Patent
Li et al.

(10) Patent No.: US 10,142,616 B2
(45) Date of Patent: Nov. 27, 2018

(54) DEVICE AND METHOD THAT COMPENSATE FOR DISPLAYED MARGIN OF ERROR IN IID

(71) Applicant: SAMSUNG ELECTRONICS CO., LTD., Suwon-si (KR)

(72) Inventors: Weiming Li, Beijing (CN); Mingcai Zhou, Beijing (CN); Shaohui Jiao, Beijing (CN); Tao Hong, Beijing (CN); Xiying Wang, Beijing (CN); Haitao Wang, Beijing (CN); Dong Kyung Nam, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 21 days.

(21) Appl. No.: 15/303,404

(22) PCT Filed: Apr. 16, 2015

(86) PCT No.: PCT/KR2015/003849
§ 371 (c)(1),
(2) Date: Oct. 11, 2016

(87) PCT Pub. No.: WO2015/160208
PCT Pub. Date: Oct. 22, 2015

(65) Prior Publication Data
US 2017/0041594 A1 Feb. 9, 2017

(30) Foreign Application Priority Data

Apr. 18, 2014 (CN) .......................... 2014 1 0157743
Apr. 14, 2015 (KR) ........................ 10-2015-0052393

(51) Int. Cl.
*H04N 13/04* (2006.01)
*H04N 17/04* (2006.01)
(Continued)

(52) U.S. Cl.
CPC ......... *H04N 13/305* (2018.05); *H04N 13/327* (2018.05); *H04N 17/04* (2013.01)

(58) Field of Classification Search
None
See application file for complete search history.

(56) References Cited

U.S. PATENT DOCUMENTS 6,496,231 B1 * 12/2002 Pronkine .............. H04N 3/2335
                                                          315/368.12
7,633,528 B2    12/2009 Fukushima et al.
(Continued)

FOREIGN PATENT DOCUMENTS

JP     2012084105 A    4/2012
KR   1020010026891 A   4/2001
(Continued)

OTHER PUBLICATIONS

International Search Report (PCT/ISA/210) dated Jul. 7, 2015, issued by the International Searching Authority in counterpart International Application No. PCT/KR2015/003849.

*Primary Examiner* — Frederick D Bailey
(74) *Attorney, Agent, or Firm* — Sughrue Mion, PLLC

(57) ABSTRACT

An eyeglass-less 3D display device, and a device and method that compensate for a displayed margin of error are provided. The display device acquires an image of an integral image display (IID) image captured by a single camera, and compensates for a margin of error which arises due to a discrepancy between the designed position of a micro lens array located on one surface of a 2D panel and the actual position thereof, so as to provide a high-quality 3D image.

24 Claims, 12 Drawing Sheets

(51) Int. Cl.
H04N 13/305 (2018.01)
H04N 13/327 (2018.01)

(56) References Cited

U.S. PATENT DOCUMENTS

| | | |
|---|---|---|
| 8,264,772 B2 | 9/2012 | Javidi et al. |
| 8,334,889 B2 | 12/2012 | Blanche et al. |
| 8,538,726 B2 | 9/2013 | Yoshikawa |
| 2012/0218388 A1* | 8/2012 | Kawakami ......... H04N 13/0022 348/47 |
| 2013/0217161 A1 | 8/2013 | Hsu |
| 2013/0222606 A1* | 8/2013 | Pitts .................... H04N 5/2254 348/187 |
| 2013/0241977 A1* | 9/2013 | Okamoto ............... G02B 27/26 345/691 |
| 2014/0043449 A1* | 2/2014 | Hung ................ H04N 13/0497 348/54 |

FOREIGN PATENT DOCUMENTS

| | | |
|---|---|---|
| KR | 1020060096596 A | 9/2006 |
| KR | 1020070112081 A | 11/2007 |
| KR | 1020090010775 A | 1/2009 |
| KR | 1020100076222 A | 7/2010 |
| KR | 101022565 B1 | 3/2011 |
| KR | 1020120095066 A | 8/2012 |
| KR | 1020120140665 A | 12/2012 |
| KR | 1020130037257 A | 4/2013 |
| KR | 101293576 B1 | 8/2013 |
| KR | 101294261 B1 | 8/2013 |

* cited by examiner

DEVICE AND METHOD THAT COMPENSATE FOR DISPLAYED MARGIN OF ERROR IN IID

CROSS REFERENCE TO RELATED APPLICATIONS

This is a National Stage application of International Application No. PCT/KR2015/003849 filed Apr. 16, 2015, which claims priority from Chinese Patent Application No. 201410157743.X filed Apr. 18, 2014, and Korean Patent Application No. 10-2015-0052393 filed Apr. 14, 2015, the disclosures of which are incorporated herein in their entireties.

FIELD

Apparatuses and methods consistent with example embodiments relate to a three-dimensional (3D) display device, and more particularly, to a device and method for correcting an error in a glassless-type integral image display (IID).

BACKGROUND

Integral image display (IID)-type three-dimensional (3D) display technology may involve a display with a high brightness and enable a user to view a 3D image with a naked eye. Such an IID-type technology may generate a 3D image by refracting a two-dimensional (2D) elemental image array (EIA) image in different directions through a refraction implemented by a microlens array located on a 2D display, for example, a liquid crystal display (LCD) panel.

An actual location of the microlens array may deviate from a designed location of the microlens array due to a characteristic quality (e.g., accuracy) of the microlens array, or an environmental characteristic (e.g., temperature) of a location at which the microlens array is disposed. Thus, correcting an error in the actual location of the microlens array may be needed for a high-quality IID-type 3D display.

SUMMARY

According to an aspect of one or more example embodiments, there is provided a device for correcting a display error, the device including an image acquirer configured to obtain a first image by capturing an integral image display (IID) image by using a single camera, and an error estimator configured to optimize an error algorithm indicating an error that corresponds to a discrepancy between an actual location of a microlens array located on one surface of a two-dimensional (2D) panel and an intended location of the microlens array, and to estimate the error based on the optimized error algorithm.

The error estimator may optimize the error algorithm by generating an initial error algorithm based on a preset initial error parameter value, and updating the initial error parameter value based on a mapping location to which a point of the first image is to be mapped on the 2D panel.

The error estimator may include a virtual mapping location determiner configured to determine the virtual mapping location to which the point of the first image is to be mapped on a virtual image plane which lies between the single camera and the microlens array by each microlens of the microlens array and a central location of the single camera, a first mapping location determiner configured to determine a first mapping location to which the virtual mapping location is to be mapped on the 2D panel by analyzing a respective relationship between each respective pixel point of the first image and a corresponding pixel point of the 2D panel, a second mapping location determiner configured to determine a second mapping location to which a connection line connecting the central location of the single camera and the virtual mapping location is to be mapped on the 2D panel, and an optimizer configured to optimize the error algorithm based on a locational difference between the first mapping location and the second mapping location.

The optimizer may optimize the error algorithm by updating the initial error parameter value to minimize the locational difference between the first mapping location and the second mapping location.

The optimizer may also optimize the error algorithm by determining a respective distance from each of at least one microlens of the microlens array to the first mapping location and a respective distance from each of the at least one microlens to the second mapping location, and determining that the initial error parameter value is optimized based on a minimal sum of the determined distances.

According to an aspect of one or more example embodiments, there is provided a display device including an image acquirer configured to obtain a first image by capturing an IID image by using a single camera, an error estimator configured to optimize an error algorithm indicating an error between an actual location of a microlens array located on one surface of a 2D panel and an intended location of the microlens array and to estimate the error based on the optimized error algorithm, and a renderer configured to render the first image to be an Elemental Image Array (EIA)-type second image based on an error associated with the microlens array.

The error estimator may include a virtual mapping location determiner configured to determine a virtual mapping location to which a point of the first image is to be mapped on a virtual image plane which lies between the single camera and the microlens array by each microlens of the microlens array and a central location of the single camera, a first mapping location determiner configured to determine a first mapping location to which the virtual mapping location is to be mapped on the 2D panel by analyzing a respective relationship between each respective pixel point of the first image and a corresponding pixel point of the 2D panel, a second mapping location determiner configured to determine a second mapping location to which a connection line connecting the central location of the single camera and the virtual mapping location is to be mapped on the 2D panel, and an optimizer configured to optimize the error algorithm based on a locational difference between the first mapping location and the second mapping location.

The optimizer may optimize the error algorithm by updating a preset initial error parameter value to minimize the locational difference between the first mapping location and the second mapping location.

The renderer may render the first image to be the second image based on a ray algorithm generated based on an actual respective location of each microlens of the microlens array determined based on the estimated error associated with the microlens array.

The renderer may include a location determiner configured to determine the actual respective location of each microlens based on the error associated with the microlens array, a ray algorithm generator configured to generate the ray algorithm indicating a three-dimensional (3D) ray corresponding to each pixel of the 2D panel based on the determined actual respective location of each microlens, and an EIA renderer configured to render the first image to be the second image using the generated ray algorithm.

The ray algorithm generator may include an initializer configured to initialize a respective relationship between a pixel of the 2D panel and each respective microlens of the microlens array, an updater configured to update the respective relationship for each respective microlens by using a point obtained by projecting a point of the first image to the 2D panel, and a direction indicator configured to indicate the pixel of the 2D panel and a direction of a microlens corresponding to the pixel by using points on two parallel planes.

The updater may include a projector configured to obtain a first projection point at which a first observation point included in the first image is projected to the 2D panel through a first microlens of the microlens array, a window arranger configured to form a window of a preset size on the 2D panel centered at the first projection point, and a local updater configured to perform updating on a respective microlens to be mapped to each pixel of the window.

The local updater may include a verifier configured to verify whether the first microlens through which the first projection point is obtained is a microlens that corresponds to the initialized corresponding relationship, a pixel projector configured to, when the first microlens does not correspond to the initialized respective relationship, obtain a second projection point by projecting a first pixel of the window to the first image based on the initialized respective relationship and obtain a third projection point by projecting the first pixel of the window to the first image based on the first microlens, and a mapping updater configured to determine a first distance between the second projection point and the first observation point and a second distance between the third projection point and the first observation point, and to update a microlens that corresponds to the pixel of the 2D panel for the first projection point to be the first microlens in response to the first distance being greater than or equal to the second distance.

According to an aspect of one or more example embodiments, there is provided a method for correcting a display error, the method including obtaining a first image by capturing an IID image by using a single camera, generating an error algorithm indicating an error between an actual location of a microlens array located on one surface of a 2D panel and an intended location of the microlens array, and estimating the error by optimizing the error algorithm.

BRIEF DESCRIPTION OF DRAWINGS

The above and/or other aspects will become apparent and more readily appreciated from the following description of example embodiments, taken in conjunction with the accompanying drawings of which.

DETAILED DESCRIPTION

Figure 1:
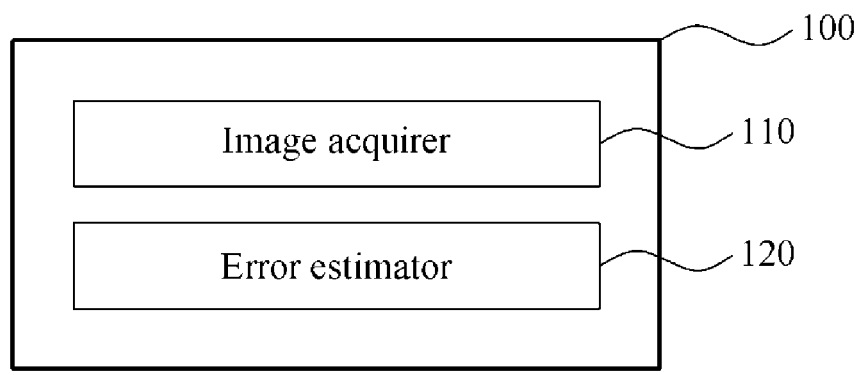
FIG. 1 is a block diagram illustrating a device for correcting a display error, according to an example embodiment.

Hereinafter, some example embodiments will be described in detail with reference to the accompanying drawings. It should be understood, however, that there is no intent to limit this disclosure to the particular example embodiments disclosed. Regarding the reference numerals assigned to the elements in the drawings, it should be noted that the same elements will be designated by the same reference numerals, wherever possible, even though they are shown in different drawings.

Terms most generally and widely used in a related technical field are used herein. However, other terms may be selected based on development and/or change of related technologies, practices, preferences by one of ordinary skill in the art, and the like. Thus, the terminology used herein is for the purpose of describing particular example embodiments only, and is not intended to limit technical features.

In addition, terms selected by an applicant are also used herein, and the meanings of such terms are described in the Detailed Description section. The terms used herein are not to be interpreted based solely on the terms themselves, but to be interpreted based on the meanings of the terms as defined herein and the overall context of the present disclosure.

FIG. 1 is a block diagram illustrating a device for correcting a display error, according to an example embodiment. The device for correcting a display error will be hereinafter referred to as a display error correcting device for simplicity. The display error correcting device includes an image acquirer 110 and an error estimator 120. The image acquirer 110 obtains a first image by capturing an internal image display (IID) image with a single camera. For a glassless-type three-dimensional (3D) display, the single camera may capture the IID image, and an error associated with a microlens may be corrected for the obtained image. A microlens array located on one surface of a two-dimensional (2D) panel may display a glassless-type 3D image by refracting the first image in different directions. Here, encoding may be performed on a location of each pixel of the 2D panel with respect to the first image obtained by capturing the IID image. In addition, decoding may be performed on the first image obtained by capturing the IID image in order to obtain a respective relationship between the first image and each pixel of the 2D panel. The first image obtained by capturing the IID image may be a black-and-white image of a 2D Gray code or a sinusoidal fringe-type image including a phase shift.

Based on the respective relationship between a pixel point of the first image and a pixel of the 2D panel, a corresponding relationship between the pixel of the 2D panel and a point on a virtual image plane of the single camera capturing the first image, for example, an image plane of an image sensor, may be obtained. In particular, as a result of the decoding performed on the first image, a location of the pixel of the 2D panel on the image plane of the single camera may be determined. Based on the corresponding relationship between the pixel of the 2D panel and the location of the pixel on the image plane of the signal camera capturing the first image, a motion parameter of the single camera may be obtained. The motion parameter may include, for example, either or both of a rotation parameter and a parallel translation parameter. The motion parameter may be obtained by using any of various methods well-known in a related technical field to which the present disclosure belongs, and thus a detailed description of the methods will be omitted here.

The error estimator 120 generates an error model (also referred to herein as an "error algorithm") indicating an error between an actual location of the microlens array located on one surface of the 2D panel and an intended location (also referred to herein as a "designed location") of the microlens array, and estimates the error by optimizing the error model. A method of estimating a display error will be described in detail with reference to FIGS. 2 and 3.

Figure 2:
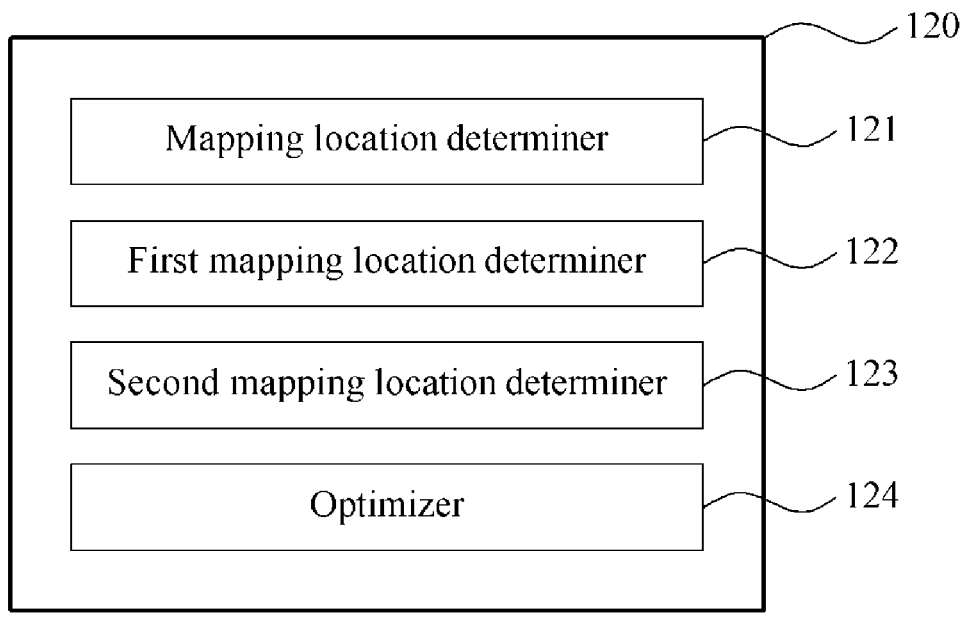
FIG. 2 is a block diagram illustrating an error estimator of a device for correcting a display error, according to an example embodiment.

FIG. 2 is a block diagram illustrating an error estimator of a display error correcting device, according to an example embodiment. The error estimator 120 of FIG. 1 may optimize the error model by generating an initial error model based on a preset initial error parameter value and updating the initial error parameter value based on a mapping location to which one point of the first image is to be mapped on the 2D panel. The error estimator 120 includes a mapping location determiner (also referred to herein as a "virtual mapping location determiner") 121, a first mapping location determiner 122, a second mapping location determiner 123, and an optimizer 124.

Figure 3:
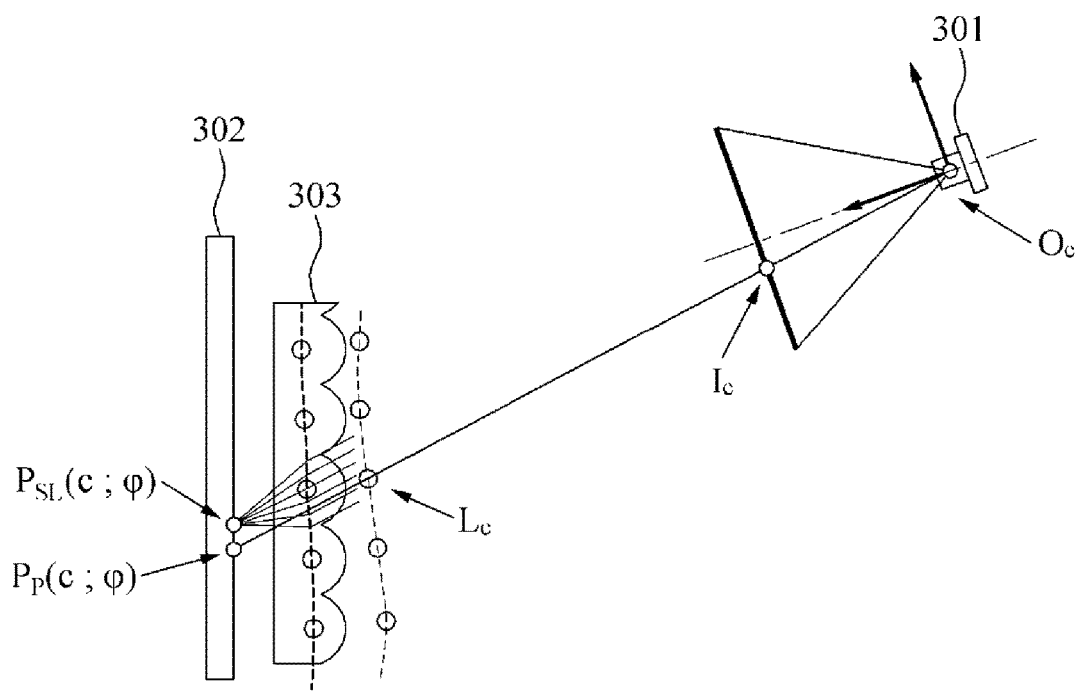
FIG. 3 is a diagram illustrating a relationship among a single camera, a two-dimensional (2D) panel, and a microlens array for correcting a display error, according to an example embodiment.

FIG. 3 is a diagram illustrating a relationship among a single camera 301, a 2D panel 302, and a microlens array 303 which is configured for correcting a display error, according to an example embodiment. Referring to FIG. 3, an error may be estimated by calculating an actual location of the microlens array 303.

Referring back to FIG. 2, the mapping location determiner 121 calculates a location of a microlens, for example, $L_c$ in FIG. 3, based on an initial error parameter. Here, the location $L_c$ corresponds to a designed location of the microlens. An error parameter $\varphi$ indicates a locational difference between a designed location of a microlens and an actual location of the microlens, and an error model is a function that indicates an error between the designed location and the actual location of the microlens based on the error parameter $\varphi$.

Equation 1 below expresses an actual location of a microlens that may be defined using a designed location of the microlens and an error model (also referred to herein as an "error algorithm").

$$\begin{bmatrix} x_{ij} \\ y_{ij} \\ z_{ij} \end{bmatrix} = \begin{bmatrix} x'_{ij} \\ y'_{ij} \\ z'_{ij} \end{bmatrix} + \begin{bmatrix} e^{(x)}_{ij} \\ e^{(y)}_{ij} \\ e^{(z)}_{ij} \end{bmatrix}$$

[Equation 1]

In Equation 1, $[x_{ij}, y_{ij}, z_{ij}]^T$ and $[x'_{ij}, y'_{ij}, z'_{ij}]^T$ denote 3D coordinates of an actual location of a microlens and 3D coordinates of a designed location of the microlens, respectively.

$[e^{(x)}_{ij}, e^{(y)}_{ij}, e^{(z)}_{ij}]^T$ denotes an error between the 3D coordinates of the actual location of the microlens and the 3D coordinates of the designed location of the microlens.

In $[e^{(x)}_{ij}, e^{(y)}_{ij}, e^{(z)}_{ij}]^T$, a total amount of calculation may be reduced by using different error models, i.e., different error algorithms, for different types of errors.

For example, an error between a designed location of a microlens and an actual location of the microlens based on a 2D panel may be represented by a rotation angle $\ominus$ and a parallel translation vector [tx, ty] in the 2D panel. Such an error may be defined as expressed in Equation 2 below based on coordinates of a center of each lens of a lens array.

$$e^{(x)}_{ij} = x'_{ij}(\cos(\theta)-1) - \sin(\theta)y'_{ij} - tx$$

$$e^{(y)}_{ij} = x'_{ij}\sin(\theta) + (\cos(\theta)-1)y'_{ij} - ty$$

[Equation 2]

In Equation 2, the error parameter $\varphi$ may be defined by including therein the rotation angle $\ominus$ and the parallel translation vector [tx, ty].

In a presence of a warping phenomenon in the lens array, a light center of the lens array may not be positioned on a single plane. In such a case, an error change in a Z direction may be defined as expressed in Equation 3 below using a single elliptic radial distortion model.

$$e^{(z)ij} = (a(x'^{ij}-x_0)^2 + b(y'^{ij}-y_0)^2)c + d$$

[Equation 3]

In Equation 3, $[x_0, y_0]$ denotes a location of a radial distortion center on a horizontal plane, and [a, b, c, d] denotes lens array distortion type parameters. Here, the error parameter $\varphi$ may be expressed as $[x_0, y_0, a, b, c, d]$.

Although Equations 2 and 3 above are equations associated with the error model, the error model may be defined by other methods, and thus the error model is not be limited by Equations 2 and 3.

The mapping location determiner 121 determines a mapping location based on a location of a microlens. Here, the location of the microlens may be indicated as central coordinates of the microlens. In detail, a point to which a point of the first image on a virtual image plane which lies between the single camera and the microlens array is mapped on an image plane by each microlens and a central location of the single camera may be determined to be the mapping location, for example, $L_c$ in FIG. 3.

Referring to FIG. 3, a central location (or central coordinates) $O_c$ of the single camera 301 may be determined based on a motion parameter value, and a virtual mapping location $I_c$ of a microlens corresponding to the first image, for example, a location on the image plane, may be obtained by projecting the designed location $L_c$ of the microlens to the virtual image plane of the single camera 301. In this aspect, an intersection point at which a connection line connecting the designed location $L_c$ of the microlens and the central location $O_c$ of the single camera 301 meets the image plane may be designated as the virtual mapping location $I_c$.

The first mapping location determiner 122 determines a first mapping location $P_{SL}(c; \varphi)$ to which the virtual mapping location $I_c$ is to be mapped on the 2D panel 302 by analyzing a respective relationship between each respective pixel point of the first image and a corresponding pixel point of the 2D panel 302. The analyzing of the respective relationship may be performed through decoding performed on the first image. Here, a location to which the virtual mapping location $I_c$ is to be mapped on the 2D panel 302 may be indicated by the first mapping location $P_{SL}(c; \varphi)$. In this manner, coordinates of a point at which a point of first image is to be displayed on the 2D panel 302 may be determined.

The second mapping location determiner 123 determines, to be a second mapping location $P_P(c; \varphi)$, a location to which the connection line connecting the central location $O_c$ of the single camera 301 and the virtual mapping location $I_c$ is to be mapped on the 2D panel 302. In particular, coordinates of a point at which the virtual mapping location $I_c$ is located on the 2D panel 302 based on the motion parameter and the designed location $L_c$ of the microlens may be indicated by the second mapping location $P_P(c; \varphi)$.

The optimizer 124 optimizes the error model based on a locational difference between the first mapping location and the second mapping location. In detail, the locational difference between the first mapping location and the second mapping location may be a distance between the first mapping location and the second mapping location, and the initial error parameter may be optimized based on the distance. According to an example embodiment, a distance between the first mapping location and the second mapping location may be calculated for each of at least one microlens of the microlens array 303, and the initial error parameter may be considered to be optimized when a sum of calculated distances is minimized.

A sum of the distances calculated for each of the at least one microlens of the microlens array 303 may be expressed by Equation 4 below.

$$E(\varphi) = \Sigma_{c \in CC}(P_P(c;\varphi) - P_{SL}(c;\varphi))^2 \quad \text{[Equation 4]}$$

In Equation 4, $_{CC}$ denotes a central location of a microlens. Here, the microlens may be at least one microlens included in the microlens array 303, and thus be a subset of the microlens array 303. $P_P(c; \varphi)$ denotes a second mapping location, where $\varphi$ denotes an error parameter, $L_c$ denotes a location of the microlens, and c denotes central coordinates of the microlens. $P_{SL}(c; \varphi)$ denotes a first mapping location, where $\varphi$ denotes an error parameter, $L_c$ denotes a location of the microlens, and c denotes central coordinates of the microlens.

$(P_P(c; \varphi) - P_{SL}(c; \varphi))^2$ denotes a distance between the second mapping location $P_P(c; \varphi)$ and the first mapping location $P_{SL}(c; \varphi)$.

The error parameter $\varphi$ may be optimized by minimizing $E(\varphi)$. For example, an optimal value of the error parameter $\varphi$ may be obtained using a heuristic nonlinear optimization algorithm such as, for example, a genetic algorithm.

A final error value of the microlens array 303 may be calculated based on the optimized error parameter in order to estimate an error associated with the microlens array 303. An actual location of a microlens may be calculated by applying an error value obtained after the optimization to a relative error model of the actual location of the microlens and a designed location of the microlens, for example, Equations 1, 2, or 3.

Figure 4:
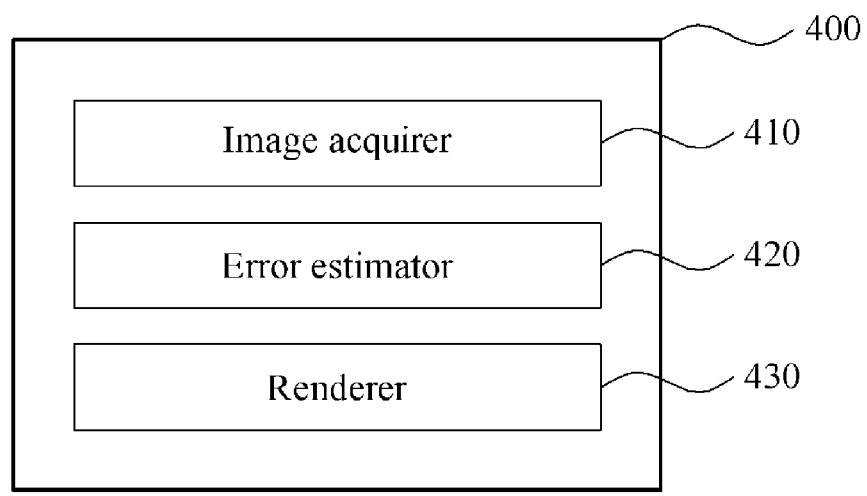
FIG. 4 is a block diagram illustrating a display device, according to an example embodiment.

According to another example embodiment, there is provided a display device that may render an image obtained by correcting a display error in an image obtained by capturing an IID image, and display the rendered image. FIG. 4 is a block diagram illustrating a display device 400 according to an example embodiment. The display device 400 includes an image acquirer 410, an error estimator 420, and a renderer 430.

The image acquirer 410 obtains a first image by capturing an IID image with a single camera. By decoding the obtained first image, a respective relationship between each respective pixel point of the first image and a corresponding pixel point of a 2D panel may be determined.

The error estimator 420 estimates an error between an actual location of a microlens array located on one surface of the 2D panel and an intended location of the microlens array by optimizing an error algorithm indicating the error between the intended location and the actual location. The error estimator 420 includes a virtual mapping location determiner, a first mapping location determiner, a second mapping location determiner, and an optimizer, which are described above with reference to FIG. 2. In detail, the virtual mapping location determiner determines a virtual mapping location to which a point of the first image is to be mapped on a virtual image plane which lies between the single camera and the microlens array by each microlens of the microlens and a central location of the single camera. Referring back to FIG. 3, a virtual mapping location $I_c$ on the virtual image plane may be determined by a location of each microlens of the microlens array, for example, the intended location $L_c$ and a central location $O_c$ of the single camera.

The first mapping location determiner determines a first mapping location, for example, $P_{SL}(c; \varphi)$, to which the virtual mapping location $I_c$ is to be mapped on the 2D panel by analyzing a respective relationship between each respective pixel point of the first image and a corresponding pixel point of the 2D panel. Here, $\varphi$ denotes an initial error parameter, and c denotes a central location of a microlens. The second mapping location determiner determines, to be a second mapping location, for example, $P_P(c; \varphi)$, a location to which a connection line connecting the central location $O_c$ of the single camera and the virtual mapping location $I_c$ is to be mapped on the 2D panel. Here, $\varphi$ denotes the initial error parameter, and c denotes the central location of the microlens. The optimizer optimizes an error model based on a locational difference, or a distance, between the first mapping location and the second mapping location. The error model may be optimized by updating an error parameter value to minimize the distance between the first mapping location and the second mapping location.

After an error value associated with a microlens is calculated, the renderer 430 renders the first image to be an elemental image array (EIA)-type second image based on an error associated with the microlens array. The rendering may be performed based on a ray model (also referred to herein as a "ray algorithm") generated based on an actual location of each microlens of the microlens array calculated based on the estimated error associated with the microlens array. A method of rendering performed by the renderer 430 will be described in detail below with reference to FIGS. 5 and 6.

Figure 5:
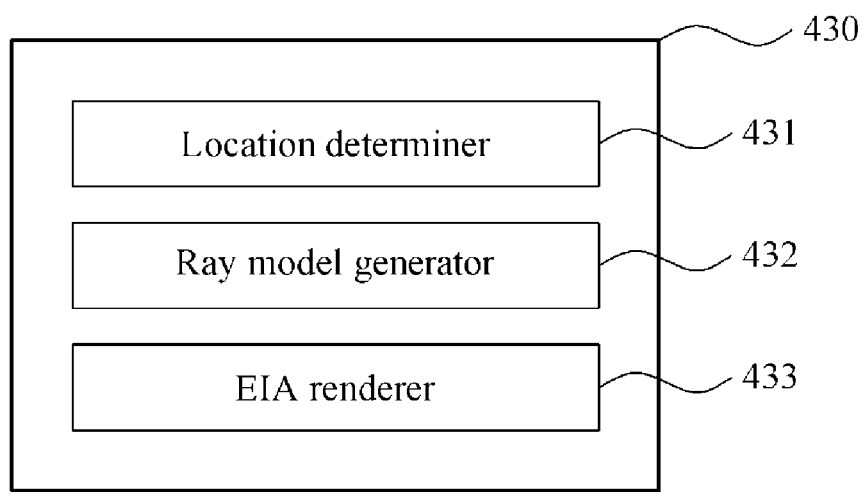
FIG. 5 is a block diagram illustrating a renderer of a display device, according to an example embodiment.

FIG. 5 is a block diagram illustrating the renderer 430 of the display device 400, according to an example embodiment. The renderer 430 includes a location determiner 431, a ray model generator 432, and an EIA renderer 433.

The location determiner 431 calculates an actual respective location of each microlens of a microlens array based on an error associated with the microlens array. For example, the actual respective location of the microlens may be calculated based on Equation 1 above.

The ray model generator 432 generates a ray model indicating a 3D ray corresponding to each pixel of a 2D panel based on an actual respective location of each microlens. The ray model may be used for rendering to be performed on an EIA image, and may be used to map each pixel of the 2D panel to a single ray in a 3D space. The ray model that is generated as a default in a presence of an error in a location of a microlens of the microlens array may not accurately perform the rendering, and thus generating the ray model based on an actual respective location of a respective microlens of the microlens array may be needed. A process of generating a ray model will be described below in detail with reference to FIG. 6.

The EIA renderer 433 renders the first image to be the EIA-type second image by using the ray model.

Figure 6:
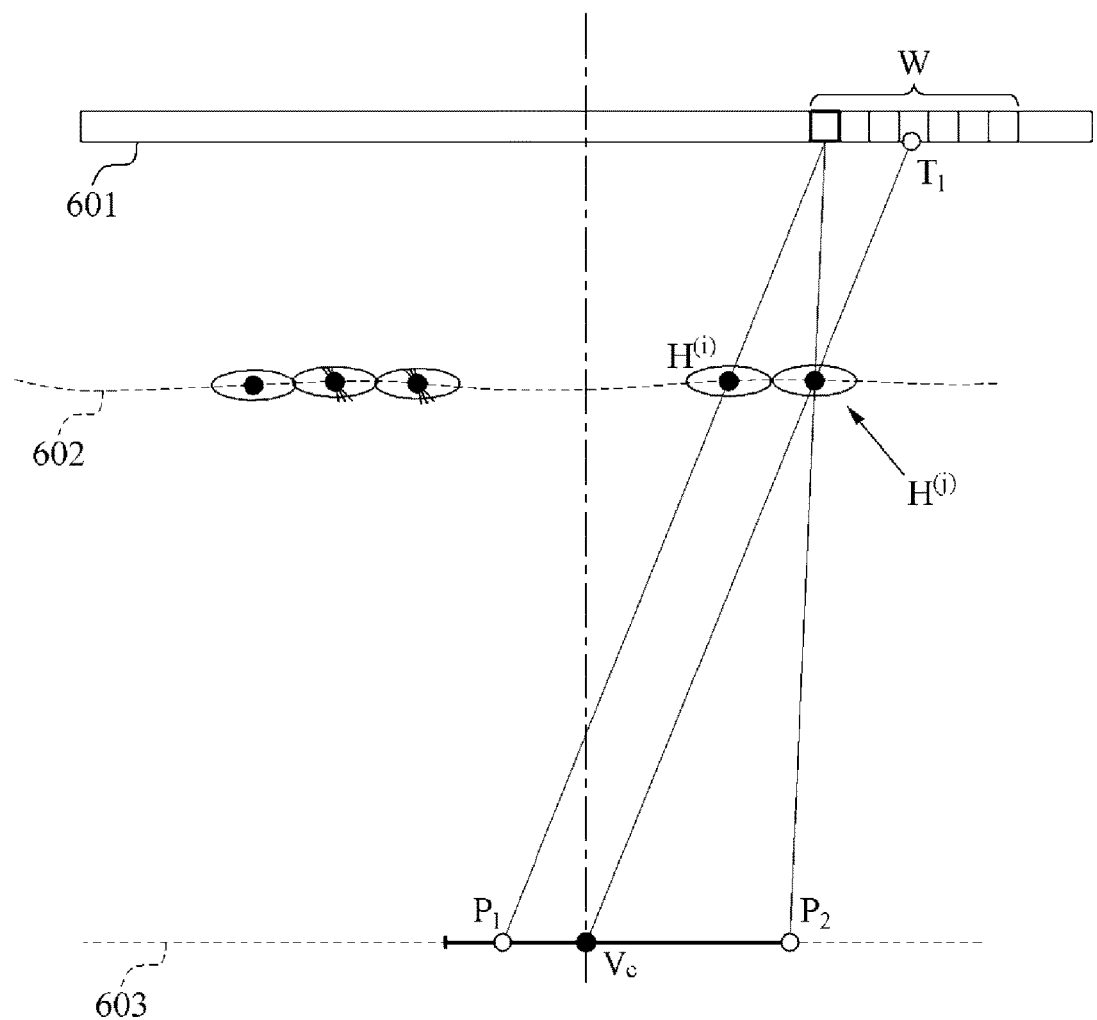
FIG. 6 is a diagram illustrating a process of rendering performed by a display device, according to an example embodiment.
Figure 7:
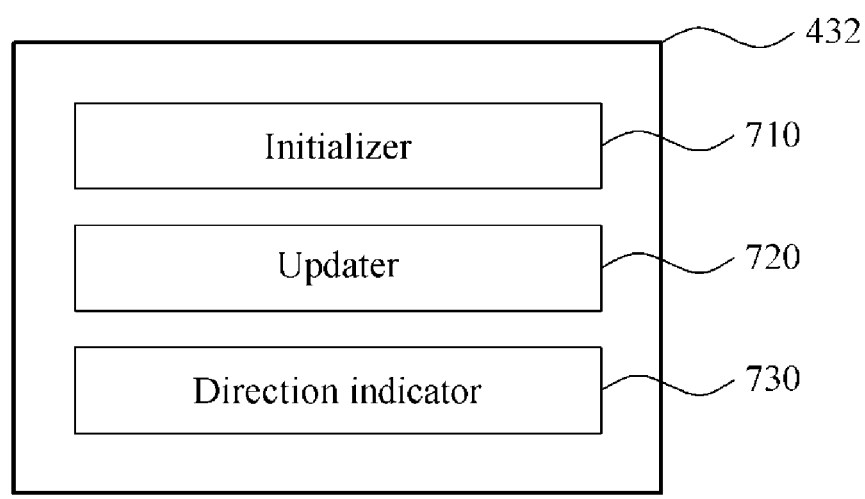
FIG. 7 is a block diagram illustrating a ray model generator of a display device, according to an example embodiment.

FIG. 6 is a diagram illustrating a process of rendering performed by the display device 400, according to an example embodiment. A process of generating a ray model in the rendering is illustrated. FIG. 7 is a block diagram illustrating the ray model generator 432 of the display device 400, according to an example embodiment. The ray model generator 432 of FIG. 5 includes an initializer 710, an updater 720, and a direction indicator 730.

The initializer 710 initializes a respective relationship between a respective pixel of a 2D panel and each corresponding microlens of a microlens array. The respective relationship may be initialized to be a preset value. For example, for the initialization, each pixel of the 2D panel may be mapped to a predetermined microlens, and the first microlens may be indicated by an initial indication sign. The initial indication sign may be different from a respective indication sign of each respective microlens.

For example, a mapping relationship, or the corresponding relationship, between a respective pixel of the 2D panel and a corresponding microlens of the microlens array may be represented through the following method. Under the assumption of coordinates (m, n) of one pixel of the 2D panel, mapping between each respective pixel and a corresponding microlens may be indicated by a respective indication sign, for example, S(m,n),T(m,n),G(m,n). Here, S(m,n),T(m,n),G(m,n) indicate coordinate values on an x, y, and z axis, respectively, with respect to a center of a respective microlens to be mapped to each corresponding pixel. For example, in an absence of a microlens with S(m,n)=0, T(m,n)=0, G(m,n)=0, (0, 0, 0), may be the initial indication sign. Here, central coordinates of a microlens mapped to each pixel through the initialization may be (0, 0, 0). The mapping relationship between the 2D panel and a microlens may also be represented by other types of indication signs, such as, for example, a number.

The updater 720 updates the respective relationship for each microlens by using a point obtained by projecting a point of the first image to the 2D panel. A method of updating the respective relationship will be described in detail below with reference to FIGS. 6 and 8. FIG. 6 illustrates a 2D panel 601, a microlens array 602, and a first image 603 (or an observation plane including a first observation point).

Figure 8:
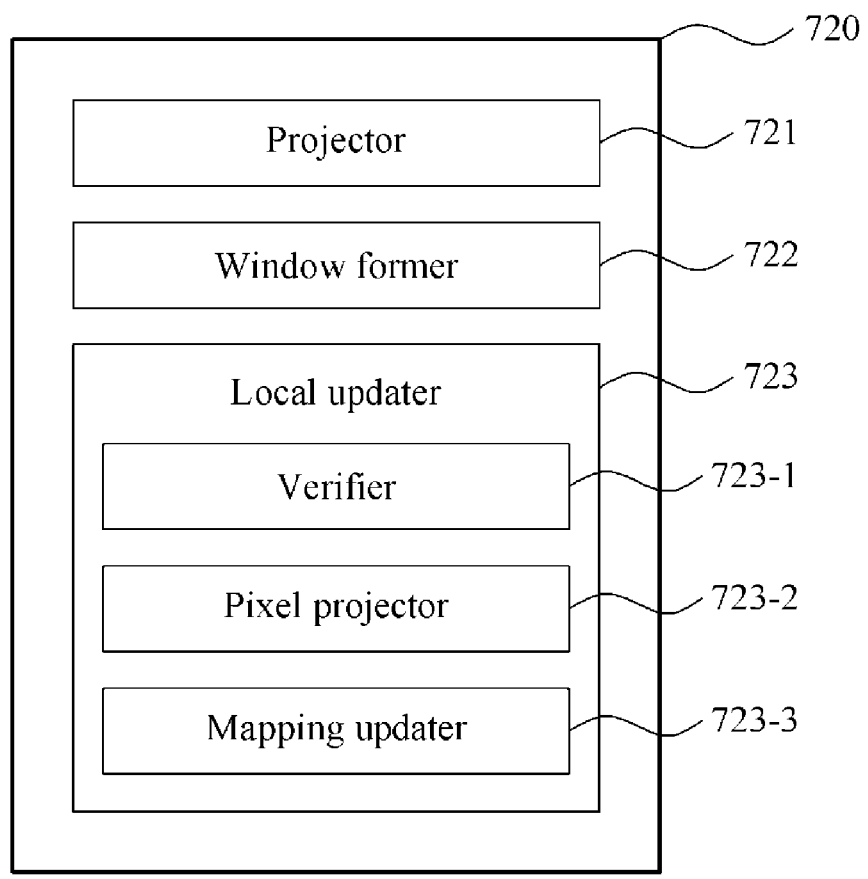
FIG. 8 is a block diagram illustrating an updater of the ray model generator of FIG. 7.

FIG. 8 is a block diagram illustrating the updater 720 of the ray model generator 432 of FIG. 7. The updater 720 includes a projector 721, a window former (also referred to herein as a "window arranger") 722, and a local updater 723, and may update a value of a ray model indicating a respective relationship between a 2D panel and a respective microlens of a microlens array.

The projector 721 obtains a first projection point to which a first observation point included in a first image is projected on a 2D panel through a certain microlens of a microlens array. Referring back to FIG. 6, a first projection point $T_1$ to which a first observation point $V_c$ included in the first image 603 or the observation plane is projected on the 2D panel 601 through a certain microlens $H^{(j)}$ of the microlens array 602 may be obtained.

The window former 722 forms a window of a preset size, centered at the first projection point, in the 2D panel. Here, various shapes of windows may be formed, for example, a circular, a spherical, a quadrate, or a rectangular window may be formed. Referring back to FIG. 6, a rectangular window W including seven pixels is formed to be centered at the first projection point $T_1$.

A length of one side of the window may be expressed as Equation 5 below.

$$1.2p(D+g)/(D \cdot s) \qquad \text{[Equation 5]}$$

In Equation 5, p denotes a size of a microlens, for example, a diameter of the microlens; D denotes a distance from a predetermined observation point to a 2D panel; s denotes a physical dimension of a pixel of the 2D panel, for example, a length of one side of a rectangular pixel; and g denotes a distance from a designed location of a microlens array to the 2D panel.

The local updater 723 performs updating on a microlens to be mapped to each pixel in the window by using the window on the 2D panel. In detail, the local updater 723 includes a verifier 723-1 configured to verify an initial respective relationship, a pixel projector 723-2 configured to calculate a second projection point and a third projection point when the initial respective relationship is not verified, and a mapping updater 723-3 configured to update the respective relationship by using the second projection point and the third projection point.

The verifier 723-1 verifies whether a certain microlens through which the first projection point is obtained corresponds to an initialized respective relationship. For example, as illustrated in FIG. 6, the first observation point $V_c$ may be projected to the first projection point $T_1$ of the 2D panel 601 through the microlens $H^{(j)}$ of the microlens array 602. Here, the verifier 723-1 may verify whether the first projection point $T_1$ among the pixels of the 2D panel 601 and the microlens $H^{(j)}$ are in a mapping relationship from the initialized respective relationship. When the mapping relationship does not correspond to the initialized respective relationship, two projection points for a first pixel, which is one of the pixels included in the window W, may be obtained. The window W may include at least one pixel of various forms, and thus the first pixel may be a pixel in the window W.

The pixel projector 723-2 obtains a second projection point by projecting the first pixel to the observation plane that includes the first image 603 based on the initialized respective relationship associated with the first pixel, for example, the initialized respective relationship between a pixel of the 2D panel and a microlens. For example, as illustrated in FIG. 6, the first pixel may be a pixel that comes first in the window W, and a second projection point $P_1$ to which the first pixel is projected on the observation plane through a microlens $H^{(j)}$ may be obtained based on the initialized respective relationship. Subsequently, a certain microlens, for example, the microlens $H^{(j)}$ through which the first observation point $V_c$ is projected to the first projection point $T_1$, may be used to obtain a third projection point $P_2$ by projecting the first pixel of the window W to the first image 603 or the observation plane.

The mapping updater 723-3 updates the respective relationship between a microlens and a pixel of the 2D panel by using the two projection points. Here, a distance between the second projection point and the first observation point is referred to as a first distance, and a distance between the third projection point and the first observation point is referred to as a second distance. When the first distance is greater than or equal to the second distance, a microlens that corresponds to a pixel of the 2D panel in association with the first projection point may be updated to be the certain microlens. In this aspect, the pixel of the 2D panel and the first observation point that corresponds to the first projection point may correspond to the microlens through which the first observation point is projected to the first projection point.

For example, as illustrated in FIG. 6, the first distance is $|V_c-P_1|$, and the second distance is $|V_c-P_2|$. When Equation 6 below is satisfied, the respective relationship may be updated.

$$|V_c-P_1| \geq |V_c-P_2| \quad \text{[Equation 6]}$$

In Equation 6, when the first distance is greater than or equal to the second distance, a microlens in the respective relationship with the pixel of the 2D panel corresponding to the first projection point $T_1$ may be updated to be the microlens $H^{(j)}$. Conversely, when the first distance is less than the second distance, the initialized respective relationship may be maintained. The mapping updater 723-3 updates a respective relationship between the 2D panel and a microlens of the microlens array by considering one point of the first image to be a first observation point.

Referring back to FIG. 7, the direction indicator 730 indicates a direction of a microlens that corresponds to a pixel of the 2D panel by using points on two parallel planes. In this aspect, the 2D panel and the microlens may be parallel to each other, and thus a ray model that determines a ray proceeding towards a 3D space from the 2D panel may be generated by using the respective points on the planes.

Figure 9:
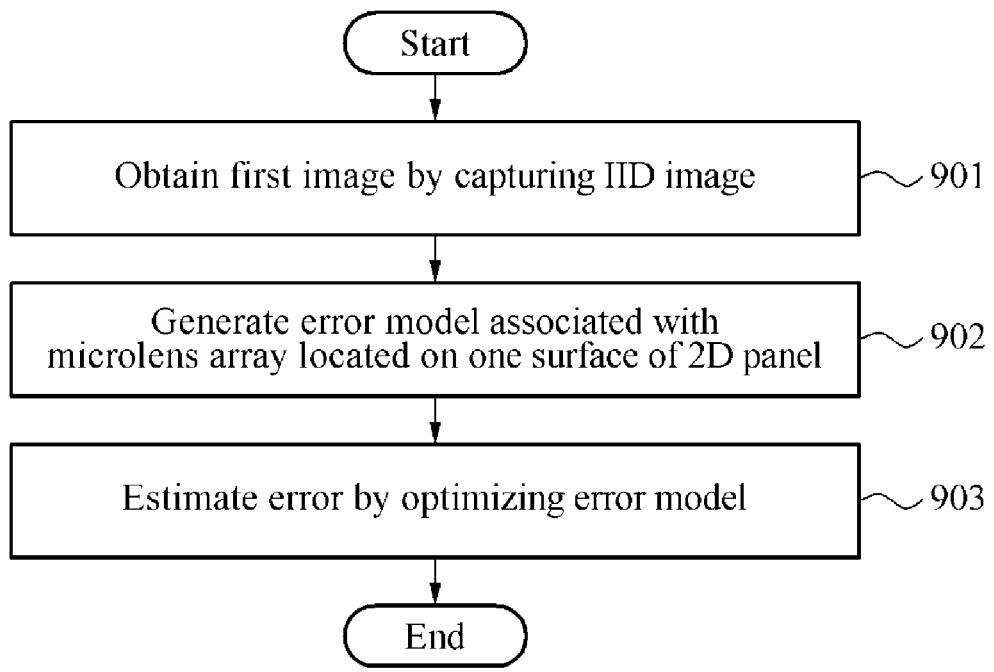
FIG. 9 is a flowchart illustrating a method for correcting a display error, according to an example embodiment.

FIG. 9 is a flowchart illustrating a method for correcting a display error, according to an example embodiment. According to an example embodiment, an error associated with a microlens array may be corrected for a first image obtained by capturing an IID image with a single camera.

In operation 901, a first image is obtained by capturing an IID image with a single camera. The IID image may be captured by using the single camera to display a glassless-type 3D image.

In operation 902, an error model indicating an error between a designed location of a microlens array located on one surface of a 2D panel and an actual location of the microlens array is generated. The error model may be defined by using a relationship between the actual location and the designed location of the microlens array as represented in Equation 1, and may be expressed using an error parameter as represented in Equations 2 and 3.

In operation 903, the error associated with the microlens array is estimated by optimizing the error model. To estimate the error, the error model may be optimized by generating an initial error model based on a preset initial error parameter value and updating the initial error parameter value based on a mapping location to which a point of the first image is to be mapped on the 2D panel. A process of optimizing the error model will be described in detail below with reference to FIG. 10.

Figure 10:
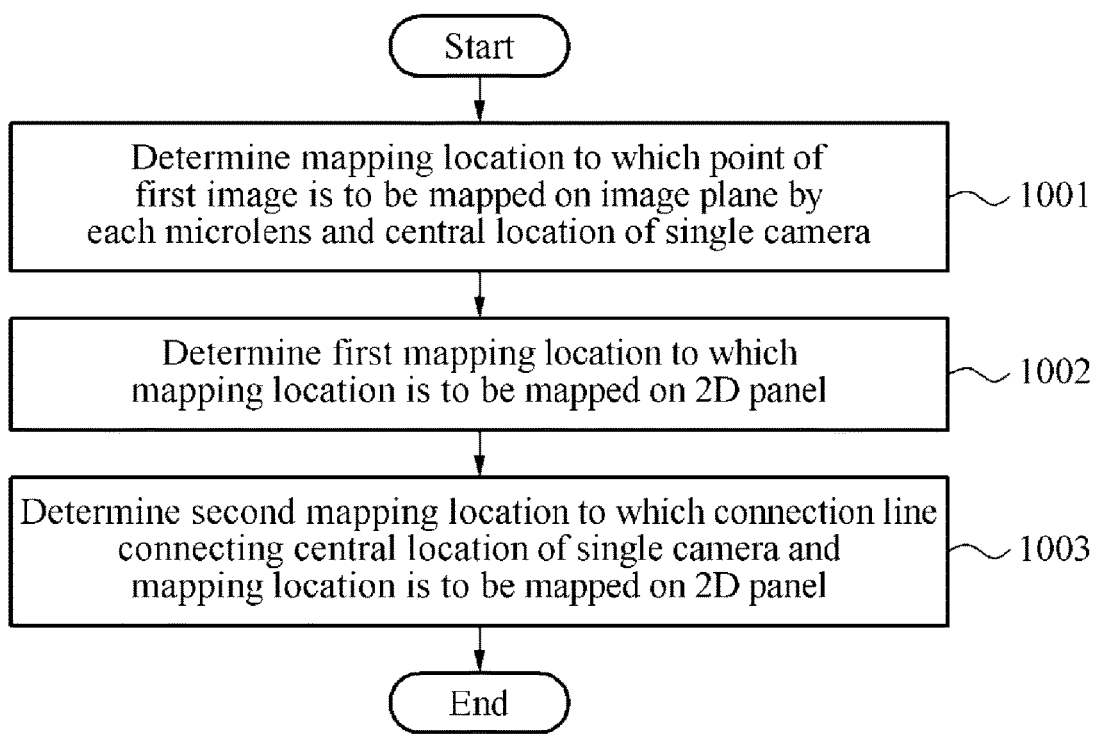
FIG. 10 is a flowchart illustrating a process of calculating a display error, according to an example embodiment.

FIG. 10 is a flowchart illustrating a process for calculating a display error, according to an example embodiment. In operation 1001, a virtual mapping location to which a point of a first image is to be mapped on a virtual image plane that lies between a single camera and a microlens array by each microlens of the microlens array and a central location of the single camera is determined. The virtual mapping location may be indicated by $I_c$ as shown in FIG. 3. In particular, an intersection point at which a connection line connecting a central location $Q_c$ of the single camera and a location $L_c$ of a microlens of the microlens array meets the virtual image plane parallel to the single camera may become the virtual mapping location $I_c$.

In operation 1002, a first mapping location to which the mapping location is to be mapped on a 2D panel is determined by analyzing a respective relationship between each respective pixel point of the first image and a corresponding pixel point of the 2D panel. For example, a first mapping location $P_{SL}(c; \varphi)$ may be defined based on an error parameter $\varphi$ and a central location c of a microlens, and the respective relationship with the corresponding pixel point of the 2D panel may be determined by performing decoding on the first image.

In operation 1003, a second mapping location to which the connection line connecting the central location of the single camera and the mapping location is to be mapped on the 2D panel is determined. For example, a second mapping location $P_P(c; \varphi)$ may indicate coordinates at which the mapping location $I_c$ is located on the 2D panel based on a motion parameter and the location $L_c$ of the microlens, and may be defined based on the error parameter $\varphi$ and the central location c of the microlens.

When the first mapping location and the second mapping location are determined, optimization may be performed on an error model based on a locational difference between the two mapping locations. A distance between the first mapping location and the second mapping location may be calculated. When a sum of calculated distances is a minimum, an initial error parameter may be considered to be optimized, and the error model may thus be optimized.

Figure 11:
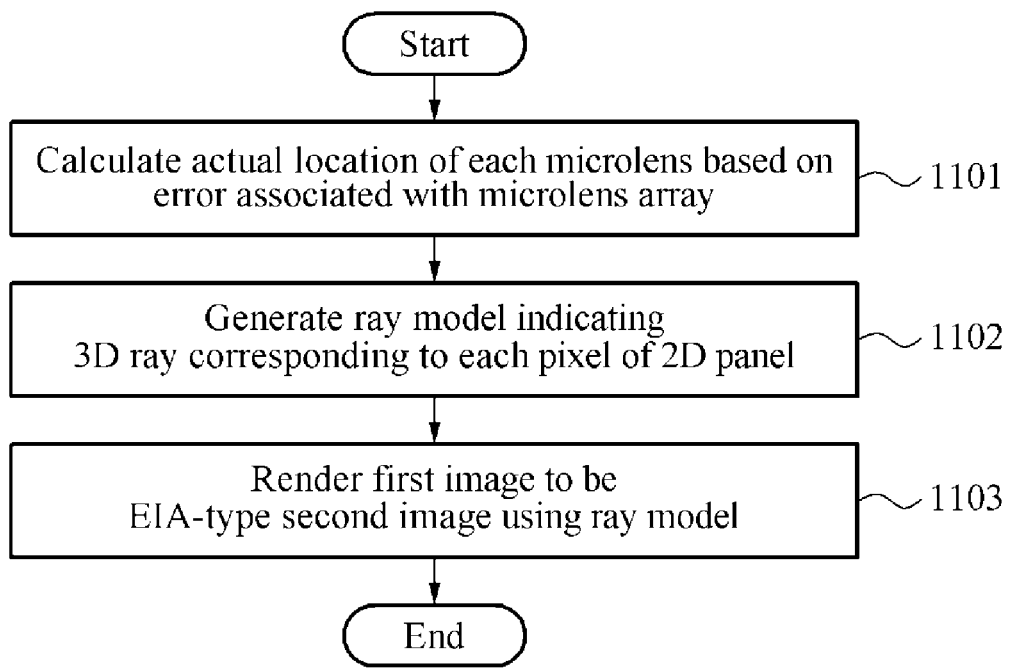
FIG. 11 is a flowchart illustrating a process of rendering based on a display error, according to an example embodiment.

According to another example embodiment, a method for correcting a display error may further include rendering the first image to be an EIA-type second image based on an error associated with the microlens array. A process of rendering will be described in detail below with reference to FIG. 11. FIG. 11 is a flowchart illustrating a process of performing rendering based on a display error, according to an example embodiment.

In operation 1101, an actual location of each microlens of a microlens array is calculated based on an error associated with the microlens array. For example, an actual location of a microlens of the microlens array may be calculated by using Equation 1 about the error associated with the microlens array, and the actual location and a designed location of the microlens.

In operation 1102, a ray model indicating a 3D ray corresponding to each pixel of a 2D panel is generated. The ray model may be used to perform rendering on an EIA image, and to map each pixel of the 2D panel to a single ray in a 3D space. The ray model may be generated by initializing a respective relationship between a microlens of the microlens array and each pixel of the 2D panel, and updating the respective relationship based on a point obtained by projecting a point of a first image to the 2D panel. A process of updating the respective relationship will be described in detail below with reference to FIG. 12.

In operation 1103, the first image is rendered to be an EIA-type second image using the generated ray model. The rendering may be performed by using any of various rendering methods, and all the methods of rendering may be applicable here.

Figure 12:
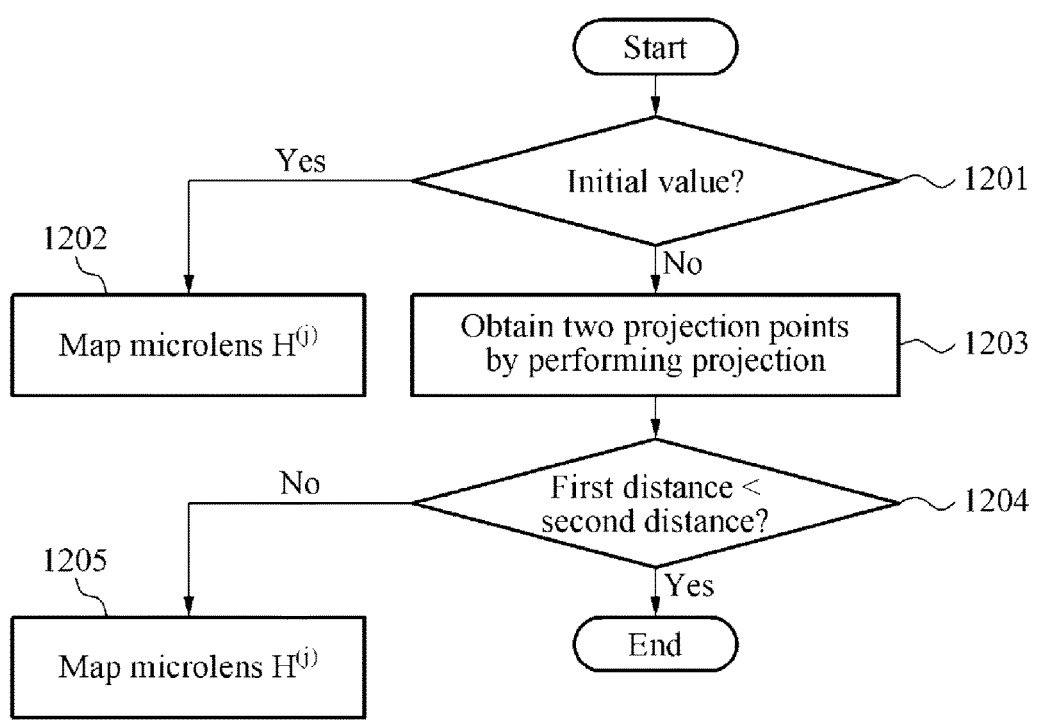
FIG. 12 is a flowchart illustrating a process of updating a corresponding relationship of a microlens, according to an example embodiment.

FIG. 12 is a flowchart illustrating a process of updating a respective relationship of a microlens, according to an example embodiment. According to an example embodiment, a ray model may be generated by initializing a respective relationship between a respective pixel of a 2D panel and each corresponding microlens of a microlens array, and updating the respective relationship between the pixel of the 2D panel and the microlens by using a point obtained by projecting a point of a first image to the 2D panel. The ray model may be generated by indicating the respective pixel of the 2D panel and a direction of a microlens corresponding to the respective pixel of the 2D panel by using points on two parallel plans. The updating of the respective relationship based on an initialized respective relationship value may include obtaining a first projection point to which a first observation point included in the first image is projected on the 2D panel through a certain microlens, forming a window of a preset size on the 2D panel centered at the first projection point, and performing updating on a microlens to be mapped to each pixel of the window. Hereinafter, a process of performing updating on a microlens to be mapped to each pixel of the window will be described in detail with reference to FIG. 12.

In operation 1201, whether a certain microlens of a microlens array, for example, a microlens H(j), through which a first projection point, for example, $T_1$, is obtained, is a microlens $H^{(j)}$ that corresponds to an initialized respective relationship, for example, $T_1$-$H^{(j)}$, is determined. When a respective relationship is determined as the initialized respective relationship, the respective relationship $T_1$-$H^{(j)}$ may be appropriate, and the microlens $H^{(j)}$ may be mapped to the microlens in operation 1202. Conversely, when the respective relationship does not correspond to the initialized respective relationship, projection may be performed to obtain two projection points in operation 1203. Referring back to FIG. 6, when a window including seven pixels is formed based on a first projection point $T_1$ obtained by projecting a first observation point $V_c$ to a 2D panel through a certain microlens $H^{(j)}$, a second projection point $P_1$ may be obtained by projecting a pixel of the window, for example, a first pixel as illustrated in FIG. 6, to an observation plane, for example, a first image 603, on which the first observation point $V_c$ is located by using an initialized respective relationship. A third projection point $P_2$ may be obtained by projecting the first pixel to the observation plane through the microlens $H^{(j)}$ through which the first projection point $T_1$ is obtained. When the second projection point $P_1$ and the third projection point $P_2$ are obtained, a distance between the first observation point $V_c$ and each of the projection points may be calculated. A first distance may be calculated between the second projection point $P_1$ and the first observation point $V_c$, and a second distance may be calculated between the third projection point $P_2$ and the first observation point $V_c$.

In operation 1204, a comparison between the first distance and the second distance is performed. When the first distance is less than the second distance, for example, No from operation 1204, the projection through the microlens $H^{(j)}$ may be more appropriate, and thus a microlens that corresponds to a pixel of the 2D panel at which the first projection point $T_1$ is located is mapped to the microlens $H^{(j)}$ in operation 1205 In such a case, the mapping may not be needed because the first projection point T1 is already mapped to the microlens $H^{(j)}$. Conversely, when the first distance is greater than or equal to the second distance, for example, Yes from operation 1204, the projection through the microlens $H^{(i)}$ may be more appropriate, a microlens corresponding to a pixel of the 2D panel at which the first projection point $T_1$ is located is mapped to the microlens $H^{(i)}$.

When the ray model is generated after the mapping based on a respective relationship between each pixel of the 2D panel and a corresponding microlens is performed, the first image may be rendered to be the EIA-type second image by using the generated ray model.

While this disclosure includes specific example embodiments, it will be apparent to one of ordinary skill in the art that various changes in form and details may be made in these example embodiments without departing from the spirit and scope of the claims and their equivalents. The example embodiments described herein are to be considered in a descriptive sense only, and not for purposes of limitation. Descriptions of features or aspects in each example embodiment are to be considered as being applicable to similar features or aspects in other example embodiments. Suitable results may be achieved if the described techniques are performed in a different order, and/or if components in a described system, architecture, device, or circuit are combined in a different manner, and/or replaced or supplemented by other components or their equivalents.

Therefore, the scope of the present disclosure is defined not by the detailed description, but by the claims and their equivalents, and all variations within the scope of the claims and their equivalents are to be construed as being included in the present disclosure.

The invention claimed is:

1. A device for correcting a display error, the device comprising:
    an image acquirer configured to obtain a first image by capturing an integral image display (IID) image by using a single camera; and
    an error estimator configured to optimize an error algorithm indicating an error that corresponds to a discrepancy between an actual location of a microlens array located on one surface of a two-dimensional (2D) panel and an intended location of the microlens array, and to estimate the error based on the optimized error algorithm.

2. The device of claim 1, wherein the error estimator is further configured to optimize the error algorithm by generating an initial error algorithm based on a preset initial error parameter value, and updating the initial error parameter value based on a mapping location to which a point of the first image is to be mapped on the 2D panel.

3. The device of claim 1, wherein the error estimator comprises:
    a virtual mapping location determiner configured to determine a virtual mapping location to which a point of the first image is to be mapped on a virtual image plane which lies between the single camera and the microlens array by each microlens of the microlens array and a central location of the single camera;
    a first mapping location determiner configured to determine a first mapping location to which the virtual mapping location is to be mapped on the 2D panel by analyzing a respective relationship between each respective pixel point of the first image and a corresponding pixel point of the 2D panel;
    a second mapping location determiner configured to determine a second mapping location to which a connection line connecting the central location of the single camera and the virtual mapping location is to be mapped on the 2D panel; and
    an optimizer configured to optimize the error algorithm based on a locational difference between the first mapping location and the second mapping location.

4. The device of claim 3, wherein the optimizer is further configured to optimize the error algorithm by updating a preset initial error parameter value to minimize the locational difference between the first mapping location and the second mapping location.

5. The device of claim 4, wherein the optimizer is further configured to determine a respective distance from each of at least one microlens of the microlens array to the first mapping location and a respective distance from each of the at least one microlens to the second mapping location, and to determine that the initial error parameter value is optimized based on a minimum sum of the determined distances.

6. A display device comprising:
   an image acquirer configured to obtain a first image by capturing an integral image display (IID) image by using a single camera;
   an error estimator configured to optimize an error algorithm indicating an error that corresponds to a discrepancy between an actual location of a microlens array located on one surface of a two-dimensional (2D) panel and an intended location of the microlens array, and to estimate the error based on the optimized error algorithm; and
   a renderer configured to render the first image to be an elemental image array (EIA)-type second image based on the estimated error associated with the microlens array.

7. The display device of claim 6, wherein the error estimator comprises:
   a virtual mapping location determiner configured to determine a virtual mapping location to which a point of the first image is to be mapped on a virtual image plane which lies between the single camera and the microlens array by each microlens of the microlens array and a central location of the single camera;
   a first mapping location determiner configured to determine a first mapping location to which the virtual mapping location is to be mapped on the 2D panel by analyzing a respective relationship between each respective pixel point of the first image and a corresponding pixel point of the 2D panel;
   a second mapping location determiner configured to determine a second mapping location to which a connection line connecting the central location of the single camera and the virtual mapping location is to be mapped on the 2D panel; and
   an optimizer configured to optimize the error algorithm based on a locational difference between the first mapping location and the second mapping location.

8. The display device of claim 7, wherein the optimizer is further configured to optimize the error algorithm by updating a preset initial error parameter value to minimize the locational difference between the first mapping location and the second mapping location.

9. The display device of claim 6, wherein the renderer is further configured to render the first image to be the second image based on a ray algorithm generated based on an actual respective location of each microlens of the microlens array determined based on the estimated error associated with the microlens array.

10. The display device of claim 9, wherein the renderer comprises:
    a location determiner configured to determine the actual respective location of each microlens based on the estimated error associated with the microlens array;
    a ray algorithm generator configured to generate the ray algorithm indicating a three-dimensional (3D) ray corresponding to each pixel of the 2D panel based on the determine actual respective location of each microlens; and
    an EIA renderer configured to render the first image to be the second image using the generated ray algorithm.

11. The display device of claim 10, wherein the ray algorithm generator comprises:

an initializer configured to initialize a respective relationship between a pixel of the 2D panel and each respective microlens of the microlens array;
    an updater configured to update the respective relationship for each respective microlens by using a point obtained by projecting a point of the first image to the 2D panel; and
    a direction indicator configured to indicate the pixel of the 2D panel and a direction of a microlens corresponding to the pixel by using points on two parallel planes.

12. The display device of claim 11, wherein the updater comprises:
    a projector configured to obtain a first projection point at which a first observation point included in the first image is projected to the 2D panel through a first microlens of the microlens array;
    a window arranger configured to form a window of a preset size on the 2D panel, centered at the first projection point; and
    a local updater configured to update the initialized respective relationship for a microlens to be mapped to each pixel of the window.

13. The display device of claim 12, wherein the local updater comprises:
    a verifier configured to verify whether the first microlens through which the first projection point is obtained is a microlens that corresponds to the initialized respective relationship;
    a pixel projector configured to, when the first microlens does not correspond to the initialized respective relationship, obtain a second projection point by projecting a first pixel of the window to the first image based on the initialized respective relationship, and obtain a third projection point by projecting the first pixel of the window to the first image based on the first microlens; and
    a mapping updater configured to determine a first distance between the second projection point and the first observation point and a second distance between the third projection point and the first observation point, and to update a microlens that corresponds to a pixel of the 2D panel corresponding to the first projection point to be the first microlens in response to the first distance being greater than or equal to the second distance.

14. A method for correcting a display error, the method comprising:
    obtaining a first image by capturing an integral image display (IID) image by using a single camera; and
    estimating an error by optimizing an error algorithm, the error algorithm indicating the error between an actual location of a microlens array located on one surface of a two-dimensional (2D) panel and an intended location of the microlens array.

15. The method of claim 14, wherein the estimating the error comprises:
    optimizing the error algorithm by generating an initial error algorithm based on a preset initial error parameter value, and updating the initial error parameter value based on a mapping location to which a point of the first image is to be mapped on the 2D panel.

16. The method of claim 15, wherein the optimizing the error algorithm comprises:
    determining a virtual mapping location to which a point of the first image is to be matched on a virtual image plane which lies between the single camera and the microlens array by each microlens of the microlens array and a central location of the single camera;

determining a first mapping location to which the virtual mapping location is to be mapped on the 2D panel by analyzing a respective relationship between each respective pixel point of the first image and a corresponding pixel point of the 2D panel;

determining a second mapping location to which a connection line connecting the central location of the single camera and the virtual mapping location is to be mapped on the 2D panel; and optimizing the error algorithm based on a locational difference between the first mapping location and the second mapping location.

17. The method of claim 16, wherein the optimizing of the error algorithm comprises:

updating the error algorithm by optimizing the initial error parameter value to minimize the locational difference between the first mapping location and the second mapping location.

18. The method of claim 17, wherein the optimizing the error algorithm comprises:

determining a respective distance from each of at least one microlens of the microlens array to the first mapping location and a respective distance from each of the at least one microlens to the second mapping location, and determining that the initial error parameter value is optimized based on a minimum sum of the determined distances.

19. The method of claim 14, further comprising:

rendering the first image to be an elemental image array (EIA)-type second image based on the estimated error associated with the microlens array.

20. The method of claim 19, wherein the rendering comprises:

rendering the first image to be the second image based on a ray algorithm generated based on an actual respective location of each microlens of the microlens array determined based on the estimated error associated with the microlens array.

21. The method of claim 20, wherein the rendering comprises:

determining the actual respective location of each microlens based on the estimated error associated with the microlens array;

generating the ray algorithm indicating a three-dimensional (3D) ray corresponding to each pixel of the 2D panel based on the determined actual respective location of each microlens; and rendering the first image to be the second image using the generated ray algorithm.

22. The method of claim 21, wherein the generating the ray algorithm comprises:

initializing a respective relationship between a pixel of the 2D panel and each respective microlens of the microlens array;

updating the respective relationship for each respective microlens by using a point to which a point of the first image is projected on the 2D panel; and indicating the pixel of the 2D panel and a direction of a microlens corresponding to the pixel by using points on two parallel planes.

23. The method of claim 22, wherein the updating the respective relationship comprises:

obtaining a first projection point to which a first observation point included in the first image is projected on the 2D panel through a first microlens of the microlens array;

forming a window of a preset size on the 2D panel, centered at the first projection point; and performing updating on a microlens to be mapped to each pixel of the window.

24. The method of claim 23, wherein the performing of the updating comprises:

verifying whether the first microlens through which the first projection point is obtained is a microlens that corresponds to the initialized respective relationship;

obtaining a second projection point by projecting a first pixel of the window to the first image based on the initialized respective relationship and obtaining a third projection point by projecting the first pixel of the window to the first image based on the first microlens, when the first microlens does not correspond to the initialized respective relationship; and determining a first distance between the second projection point and the first observation point and a second distance between the third projection point and the first observation point, and updating, to be the first microlens, a microlens that corresponds to the pixel of the 2D panel corresponding to the first projection point.

* * * * *